(12) United States Patent
Hijma et al.

(10) Patent No.: US 11,832,763 B2
(45) Date of Patent: Dec. 5, 2023

(54) OVEN, AS WELL AS A METHOD FOR STIRRING FOODSTUFF CONTAINED IN A VESSEL DISPOSED IN THE COOKING CAVITY OF SUCH AN OVEN AND A STIRRER MEMBER FOR SUCH AN OVEN

(71) Applicant: EGGCITING PRODUCTS B.V., De den Bosch (NL)

(72) Inventors: Herman Hijma, Kampen (NL); Oscar Slurink, Heino (NL); Dennis Giezeman, The Hague (NL); Michael Kasbergen, Schoonhoven (NL); Marcel Alexander Bivert, Maastricht (NL)

(73) Assignee: EGGCITING PRODUCTS B.V., De Den Bosch (NL)

( * ) Notice: Subject to any disclaimer, the term of this patent is extended or adjusted under 35 U.S.C. 154(b) by 371 days.

(21) Appl. No.: 17/257,561

(22) PCT Filed: Jul. 2, 2019

(86) PCT No.: PCT/EP2019/067731
§ 371 (c)(1),
(2) Date: Dec. 31, 2020

(87) PCT Pub. No.: WO2020/007859
PCT Pub. Date: Jan. 9, 2020

(65) Prior Publication Data
US 2021/0282589 A1    Sep. 16, 2021

(30) Foreign Application Priority Data

Jul. 4, 2018   (NL) ..................... 2021239

(51) Int. Cl.
*A47J 37/06*    (2006.01)
*A23L 5/10*    (2016.01)
(Continued)

(52) U.S. Cl.
CPC ............. *A47J 37/0664* (2013.01); *A23L 5/13* (2016.08); *A23L 5/15* (2016.08); *A47J 27/04* (2013.01);
(Continued)

(58) Field of Classification Search
CPC ...... A47J 37/0664; A47J 27/04; A47J 36/165; A47J 36/0629; A47J 36/044; A47J 36/06;
(Continued)

(56) References Cited

U.S. PATENT DOCUMENTS 4,751,357 A * 6/1988 Boulard ............... H05B 6/6411
219/754
4,904,834 A    2/1990 Bowen
(Continued)

FOREIGN PATENT DOCUMENTS

CN    1843272 A    10/2006
CN    102727067 A    10/2012
(Continued)

OTHER PUBLICATIONS

Office Action from Japanese Patent Application No. 2021-522130 dated Feb. 14, 2023, with its English translation from Global Dossier.
(Continued)

*Primary Examiner* — Steven N Leff
(74) *Attorney, Agent, or Firm* — Ladas & Parry, LLP

(57) ABSTRACT

An oven comprises a cooking cavity, a stirring member extending, in use, into foodstuff contained in a vessel disposed in the cooking cavity as well as drive means to provide, in use, relative movement between the stirring member and the vessel. The oven comprises a displacement device to move the stirring member from outside the cooking cavity through an opening in a wall bounding the
(Continued)

cooking cavity into the cooking cavity as well as, in use, into the vessel disposed in the cooking cavity.

18 Claims, 23 Drawing Sheets

(51) Int. Cl.
  *A47J 27/04* (2006.01)
  *A47J 36/16* (2006.01)
  *A47J 43/044* (2006.01)
  *A47J 43/06* (2006.01)
  *A47J 43/07* (2006.01)
  *H05B 6/64* (2006.01)
  *B01F 27/17* (2022.01)
  *B01F 29/83* (2022.01)
  *B01F 101/06* (2022.01)

(52) U.S. Cl.
  CPC ......... *A47J 36/165* (2013.01); *A47J 37/0629* (2013.01); *A47J 43/044* (2013.01); *A47J 43/06* (2013.01); *A47J 43/0711* (2013.01); *B01F 27/17* (2022.01); *B01F 29/83* (2022.01); *H05B 6/6411* (2013.01); *A23V 2002/00* (2013.01); *A47J 2027/043* (2013.01); *A47J 2043/04481* (2013.01); *B01F 2101/06* (2022.01)

(58) Field of Classification Search
  CPC .............. A47J 36/0711; A47J 2027/043; A47J 2043/04481; A23L 5/15; A23L 5/13; A23V 2002/00
  See application file for complete search history.

(56) References Cited

U.S. PATENT DOCUMENTS

| 5,021,621 | A | | 6/1991 | Demmer | |
|---|---|---|---|---|---|
| 5,899,565 | A | * | 5/1999 | Camezon | A47J 43/082 |
| | | | | | 219/726 |
| 5,935,480 | A | | 8/1999 | Takeoka et al. | |
| 8,092,072 | B2 | | 1/2012 | Parias Cruz | |
| 2004/0173606 | A1 | * | 9/2004 | Lindley | H05B 6/6411 |
| | | | | | 219/754 |
| 2004/0251250 | A1 | | 12/2004 | Haedrich | |
| 2006/0096979 | A1 | | 5/2006 | Kaneko | |
| 2012/0305549 | A1 | * | 12/2012 | Wylie | H05B 6/6411 |
| | | | | | 219/726 |

FOREIGN PATENT DOCUMENTS

| EP | 2508110 | B1 | | 7/2014 | |
|---|---|---|---|---|---|
| GB | 2159027 | A | | 11/1985 | |
| GB | 2322271 | A | | 8/1998 | |
| GB | 2406801 | A | * | 4/2005 | ............. A47J 43/07 |
| JP | H01-131823 | A | | 5/1989 | |
| JP | 2009502283 | A | | 1/2009 | |
| JP | 2013027834 | A | | 2/2013 | |
| WO | WO-9310648 | A1 | * | 5/1993 | ........... H05B 6/6411 |
| WO | WO-0251210 | A1 | * | 6/2002 | ........... H05B 6/6411 |

OTHER PUBLICATIONS

International Search Report in the international application No. PCT/EP2019/067731, dated Sep. 23, 2019.
Written Opinion in the international application No. PCT/EP2019/067731, dated Sep. 23, 2019.
Office Action for Chinese Patent Application 201980043277.3 dated Dec. 1, 2022 and its English translation.

* cited by examiner

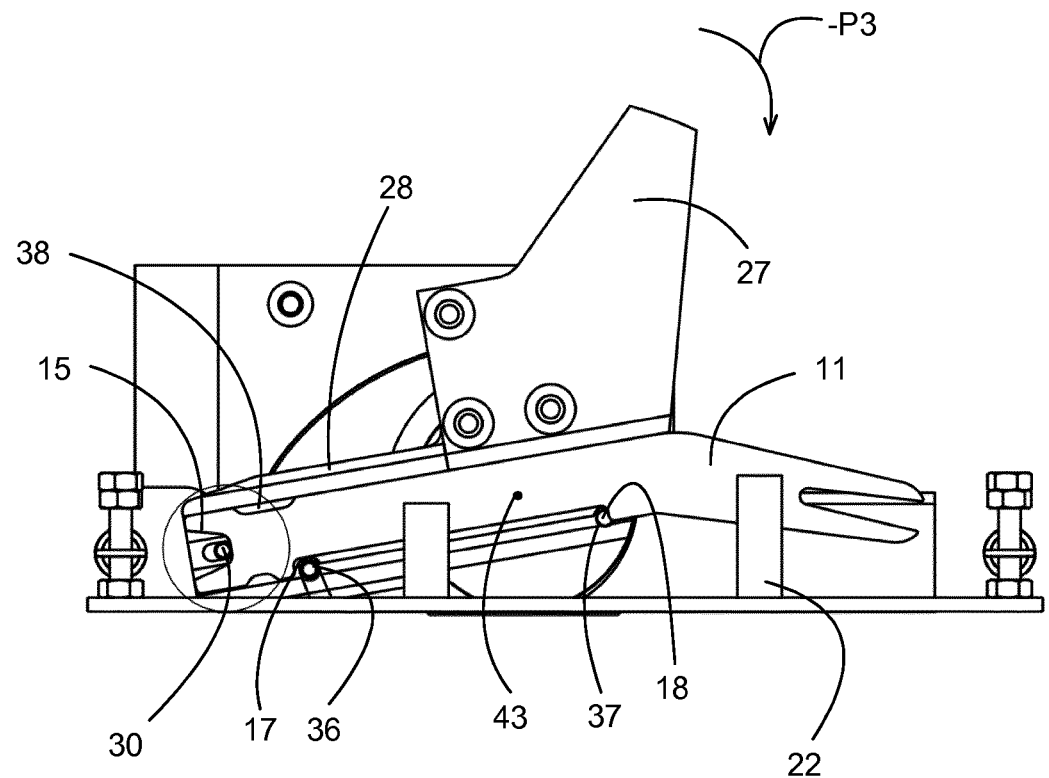
Fig. 4B1
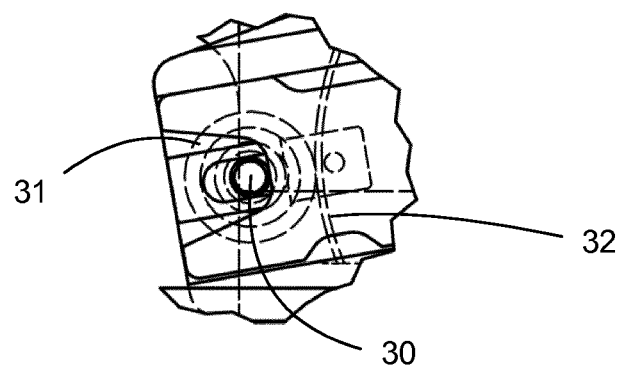
Fig. 4B2

OVEN, AS WELL AS A METHOD FOR STIRRING FOODSTUFF CONTAINED IN A VESSEL DISPOSED IN THE COOKING CAVITY OF SUCH AN OVEN AND A STIRRER MEMBER FOR SUCH AN OVEN

CROSS-REFERENCE TO RELATED APPLICATIONS

The present application is the U.S. national phase of PCT Application No. PCT/EP2019/067731 filed on Jul. 2, 2019, which claims priority to Netherlands Patent Application No. 2021239 filed on Jul. 4, 2018, the disclosures of which are incorporated herein by reference in their entireties.

FIELD OF THE INVENTION

The invention relates to an oven comprising a cooking cavity, a stirring member extending, in use, into foodstuff contained in a vessel disposed in the cooking cavity as well as drive means to provide, in use, relative movement between the stirring member and the vessel.

The invention also relates to a method for stirring foodstuff contained in a vessel disposed in the cooking cavity of an oven by means of a stirring member, whereby the vessel is relatively moved with respect to the stirring member.

The method further relates to a stirrer member for such an oven.

BACKGROUND OF THE INVENTION

By a microwave oven and method as known from GB2159027, the microwave oven cavity is provided with a conventional vertical rotational drive shaft for rotating a bowl. The bowl has a lid, which supports a stirring paddle. During use, gears and gearing track around the rim of bowl cause relative rotational movement between the bowl and paddle, which effects agitation of any foodstuff, such as soups, sauces, etc., in the blow, whilst the foodstuff is being cooked by microwave energy emitted into the cavity, as well as during periods when the foodstuff is not being cooked.

By this microwave oven a lid is needed to support the stirring paddle and this lid must be placed on top of the bowl before the bowl can be placed in the microwave oven cavity. After preparing the foodstuff, the lid and the stirring paddle needs to be cleaned before it can be used again. Furthermore, rotation of the paddle depends on the rotation of the bowl.

SUMMARY OF THE INVENTION

At least one of the objects of the invention is to provide an oven whereby the placement of the stirring member in the vessel by a user is been simplified.

This object is accomplished with the oven according to the invention in that the oven comprises a displacement device to move the stirring member from outside the cooking cavity through an opening in a wall bounding the cooking cavity into the cooking cavity as well as, in use, into the vessel disposed in the cooking cavity.

An oven according to this patent application is every device by means of which the foodstuff can be heated. The vessel can be located inside the cooking cavity of the oven.

With such a displacement device, a user only needs to place the stirring member in the displacement device, after which the displacement device will automatically move the stirring member through an opening in a wall bounding the cooking cavity into the vessel disposed in the cooking cavity.

During or after cooking, the stirrer member can be used as cutlery. The displacement device can be used in combination with a number of different kinds of vessels. Since the stirring member is being moved from outside the cooking cavity into the vessel disposed in the cooking cavity, less material is needed inside the cooking cavity to achieve stirring and less energy will be absorbed by material other than the foodstuff in the vessel. Furthermore, this provides the possibility to move the stirrer member independent from a rotation of the vessel about a vertical axis. This could give options in optimizing a cooking program, for example letting depend the rotational speeds from the temperature of the foodstuff.

An embodiment of the oven according to the invention is characterized in that the oven comprises a holder for holding a number of stirring members, wherein the displacement device is provided with a separating device to separate one of the stirring members from the number of stirring members located in said holder and to move said first one of the number of stirring members from outside the cooking cavity through the wall bounding the cooking cavity into the cooking cavity as well as, in use, into the vessel disposed in the cooking cavity.

With such a holder an operator will place the number of stirring members in the holder, after which a user only needs to place the foodstuff in the vessel or a vessel comprising the foodstuff in the cooking cavity, after which the one stirring member will be automatically positioned in the vessel by the displacement device. After preparing the foodstuff, the vessel with the prepared foodstuff as well as the stirring member can be removed from the cooking cavity, so that subsequently a next vessel with foodstuff can be inserted into the cooking cavity. Depending on the shape of the stirring member, the stirring member can be used as an eating utensil, like a fork, spoon, spork, skewer. The stirring member can be disposable or reusable.

Another embodiment of the oven according to the invention is characterized in that the number of stirring members are stacked upon each other in the holder in a stacking direction, which displacement device comprises a transport device to transport the stacked number of stirring members in the stacking direction, which separating device comprises a pivoting device to pivot a first one of the stacked number of stirring members about a pivot axis extending parallel to the stacking direction through the opening in the wall.

Stacking of the stirring members ensures that a relative large number of stirring members can be compactly and easily stored. Furthermore, movement of the stacked number of stirring members can easily be done in the stacking direction without the risk that the stack gets distorted. By pivoting the first one of the stacked number of stirring members about a pivot axis extending parallel to the stacking direction, said stirring member is being separated from the rest of the stack and can be moved through the opening in the wall.

Such pivoting is especially simple in case that the stirring members are plate shaped, wherein the number of stirring members are stacked upon each other in the holder with plate-shaped surfaces of adjacent stirring members being in abutment with each other.

Another embodiment of the oven according to the invention is characterized in that the displacement device comprises a translation device to translate the pivoted stirring member in a translation direction extending perpendicular to the pivot axis towards the vessel.

By means of such translation device it is possible to pivot the stirring member about a pivot axis located close to an end of the stirring member and close to the opening in the wall, whereas as the end of the stirring member has been moved through the opening in the wall, the stirring member can be moved in the translation direction extending perpendicular to the pivot axis towards the vessel. In this manner, the opening in the wall can be relatively small. This has the advantage that no or relatively simple additional manners need to be taken to avoid that microwaves will go through the opening to the outside of the microwave oven, in case the oven is a microwave oven. Also in case that the oven is a steam oven, the relative small opening in the wall has the advantage that no or relatively simple additional manners need to be taken to avoid that steam will go through the opening to the outside of the steam oven.

Another embodiment of the oven according to the invention is characterized in that the stirring member is translated under spring force in the translation direction.

In such a manner, the stirring member can easily be translated.

Another embodiment of the microwave oven according to the invention is characterized in that the displacement device comprises a releasing device to release the stirring member from the displacement device.

In this manner, the stirring member will be held by the displacement device in the vessel, until the stirring member is being released by the releasing device. The releasing device can be actuated for example as soon as the cooking of the foodstuff has been finished and no more relative movement between the vessel and stirring member is needed.

Another embodiment of the oven according to the invention is characterized in that the drive means comprises means to rotate, in use, the vessel with respect to the stirring member about a rotating axis, whilst the displacement device comprises means to swivel the stirring member about a swivel axis extending at an angle of between 60-120 degrees, preferably substantially perpendicular to the rotating axis.

Rotating of the vessel ensures that a more uniform heating of the foodstuff in the vessel occurs by preventing the formation of hotspots. The foodstuff is mixed inside the vessel by means of the stirrer member, which further prevents the formation of hotspots. In case that the foodstuff for example changes from liquid to a more solid state like by scrambled eggs, the stirrer member also causes a mixing of the more liquid foodstuff and more solidified foodstuff. Although it is preferred that the swivel axis extends perpendicular to the rotating axis in view of the simplicity of the design, an angle between 60-120 degrees is also possible to still have a swivelling movement in addition to a rotational movement.

By also swivelling the stirrer member with respect to the vessel and the foodstuff located therein, the foodstuff is being further mixed. By moving the stirrer member with respect to the foodstuff, it is also prevented that the foodstuff will get attached to the stirrer member and will be moved together with the stirrer mechanism with respect to the vessel. Due to the swivelling movement, the foodstuff is being cut. This is especially interesting by preparing scrambled eggs. So far it was not possible to prepare scrambled eggs in an oven since by no prior art oven a stirrer member can be rotated as well as stirred with respect to the vessel, which kind of motion provides the cooked egg with scrambled egg appearance with pieces of cooked egg. The foodstuff may also comprise an egg mixture, which foodstuff after cooking has a scrambled egg appearance with pieces of cooked egg mixture. Sticking of the foodstuff to the stirrer member depends amongst others on the kind of foodstuff, the material and smoothness of the stirrer member, the rotational speed of the vessel, the swivelling speed of the stirrer member, the shape of the stirrer member and the displacement of the stirrer member.

Another embodiment of the oven according to the invention is characterized in that the oven is a microwave oven, a steam oven or another kind of oven.

By means of microwaves or steam foodstuff can easily be heated at a desired speed to a desired temperature.

The invention also relates to a method for stirring foodstuff contained in a vessel disposed in the cooking cavity of an oven by means of a stirring member, whereby the vessel is relatively moved with respect to the stirring member, which method is characterized in that by means of a displacement device the stirring member is being moved from outside the cooking cavity through an opening in a wall bounding the cooking cavity into the cooking cavity and into the vessel disposed in the cooking cavity.

With such a method, a stirring member can easily be inserted into the vessel.

BRIEF DESCRIPTION OF THE DRAWINGS

The oven and method according to the invention will further be explained with reference to the drawings, wherein.

In the drawings, like reference numerals refer to like elements.

DESCRIPTION OF PREFERRED EMBODIMENTS

Figure 1A:
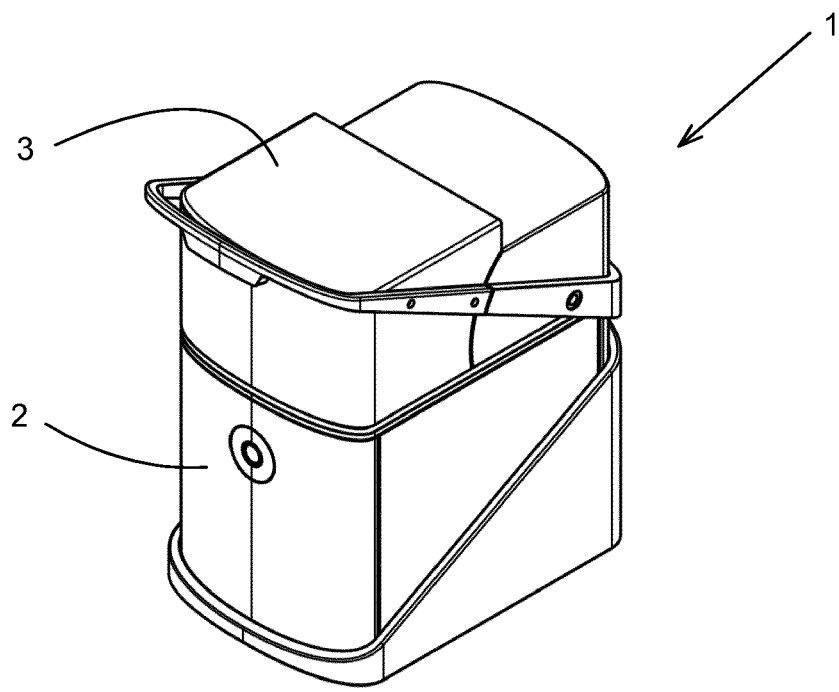
FIGS. 1A and 1B are perspective views of a microwave oven according to the invention, whereby in FIG. 1A the microwave oven is being closed and in FIG. 1B the microwave oven is being opened.
Figure 1B:
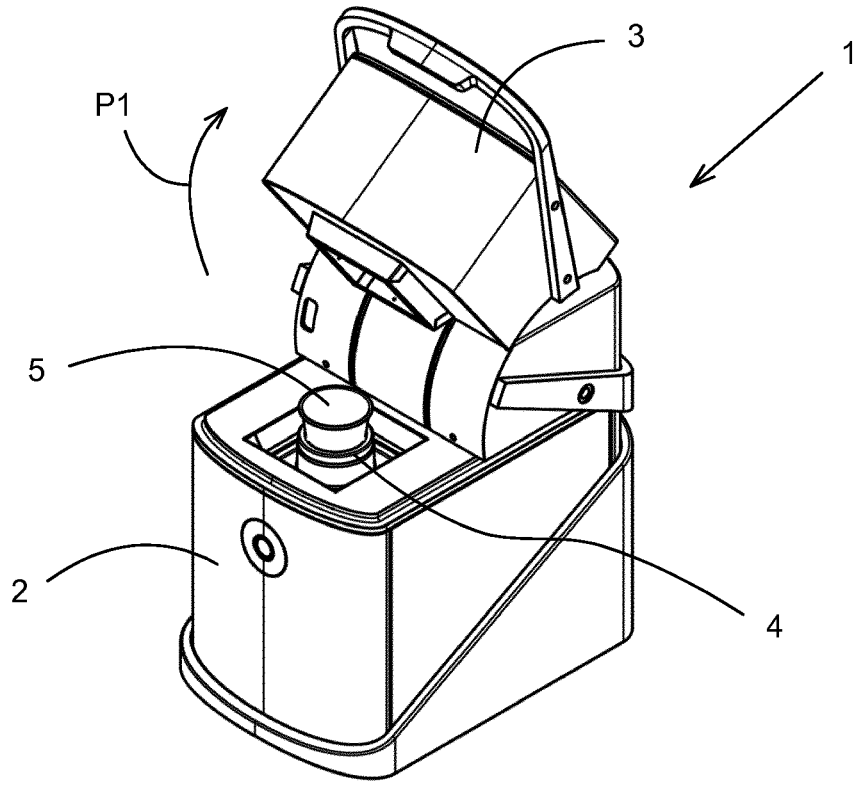

FIGS. 1A and 1B show perspective views of a microwave oven 1 according to the invention. The microwave oven 1 comprises a lower part 2 and an upper part 3 which can be pivoted in a direction as indicated by arrow P1 from a closed position as shown in FIG. 1A to an open position as shown in FIG. 1B.

The lower part 2 comprises a holder 4 in which a vessel 5 like a cup can be removable placed in the open position of the microwave oven 1.

In the vessel 5 foodstuff to be prepared in the microwave oven 1 can be inserted. The foodstuff can be a liquid like soup or sauce or a mixture to prepare a scrambled egg comprising egg or only egg white and if desired milk, mushrooms, tomatoes, unions bacon, chicken, banana, cream, yoghurt, salmon, herbs of any kind (pepper, salt, oregano), leek, capers, cheese etc. The foodstuff can also be a mixture for a shredded pancake like Kaiserschmarrn, noodles or a muffin.

Figure 2A:
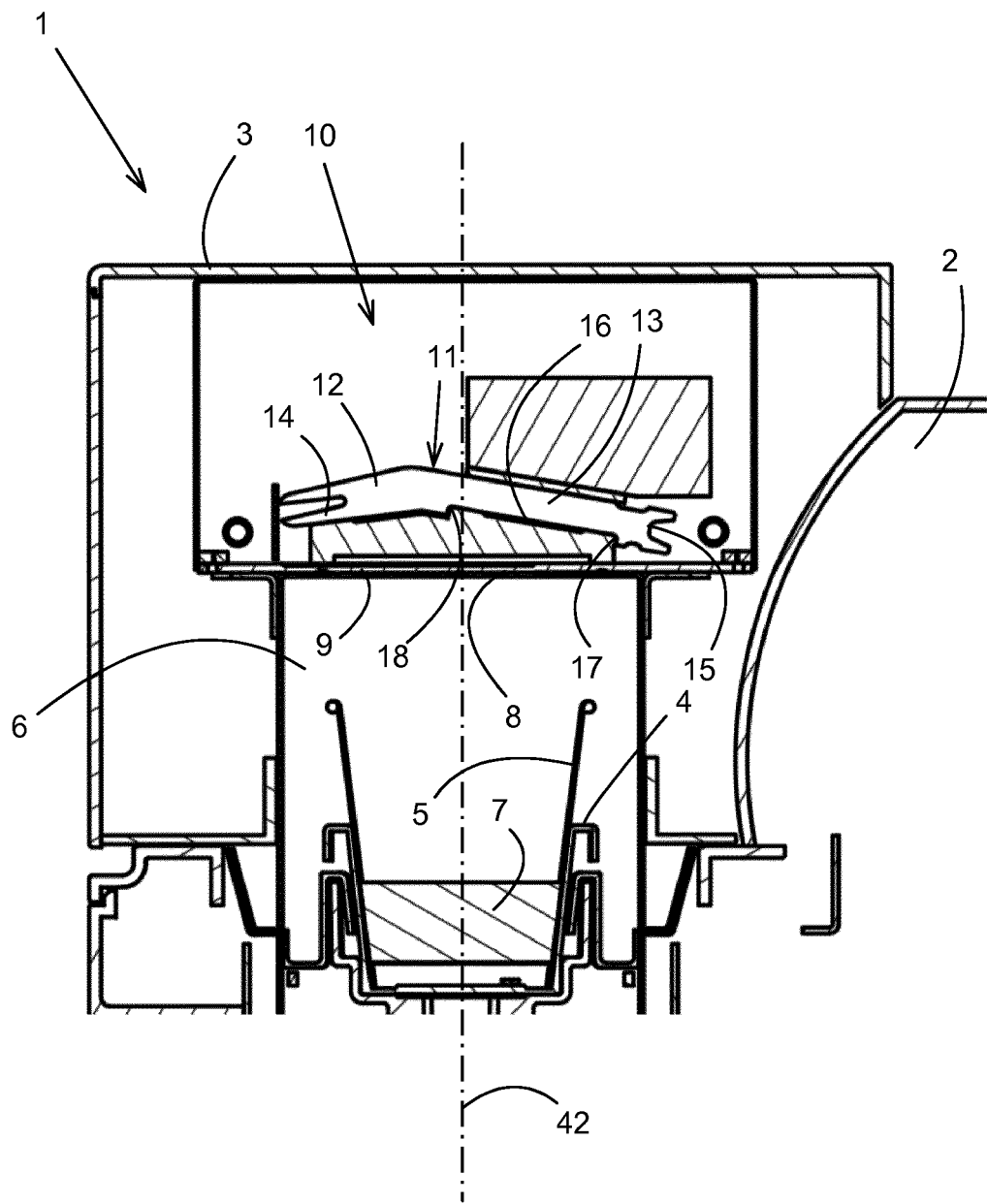
FIG. 2A-2C are detailed cross sections of the microwave oven as shown in FIG. 1A, in respectively a position wherein the stirring member is located outside the cooking cavity, is located inside the vessel in a first position and is located inside the vessel in a second position.

FIG. 2A is a detailed cross sections of the microwave oven 1 as shown in FIG. 1A, showing the holder 4 with the vessel 5 located in the cooking cavity 6. In the vessel 5 foodstuff 7 is present. The cooking cavity 6 is bounded by an upper wall 8 being provided with a slotted hole like opening 9.

The upper part 3 of the microwave oven 1 is provided with a displacement device 10 mounted on top of the upper wall 8. As will be explained here below, by means of the displacement device 10 a stirrer member 11 can be moved through the opening 9 in the upper wall 8 into the vessel 5 and depending on the level of the foodstuff 7 in the vessel 5, also in the foodstuff 7.

The stirrer member 11 is plate shaped and comprises a first part 12 and a second part 13 extending under an angle with the first part 12. The first part 12 is provided at its end with two teeth 14 which will be used to stir the foodstuff 7 during and/or after cooking in the microwave oven 1 as well as eating utensil for a user to eat the prepared foodstuff from the vessel 5, after the vessel 5 has been taken out of the microwave oven 1.

The second part 13 comprises at its end with a U shaped opening 15 as well as on one side wall 16 abutment portions 17, 18.

Figure 3:
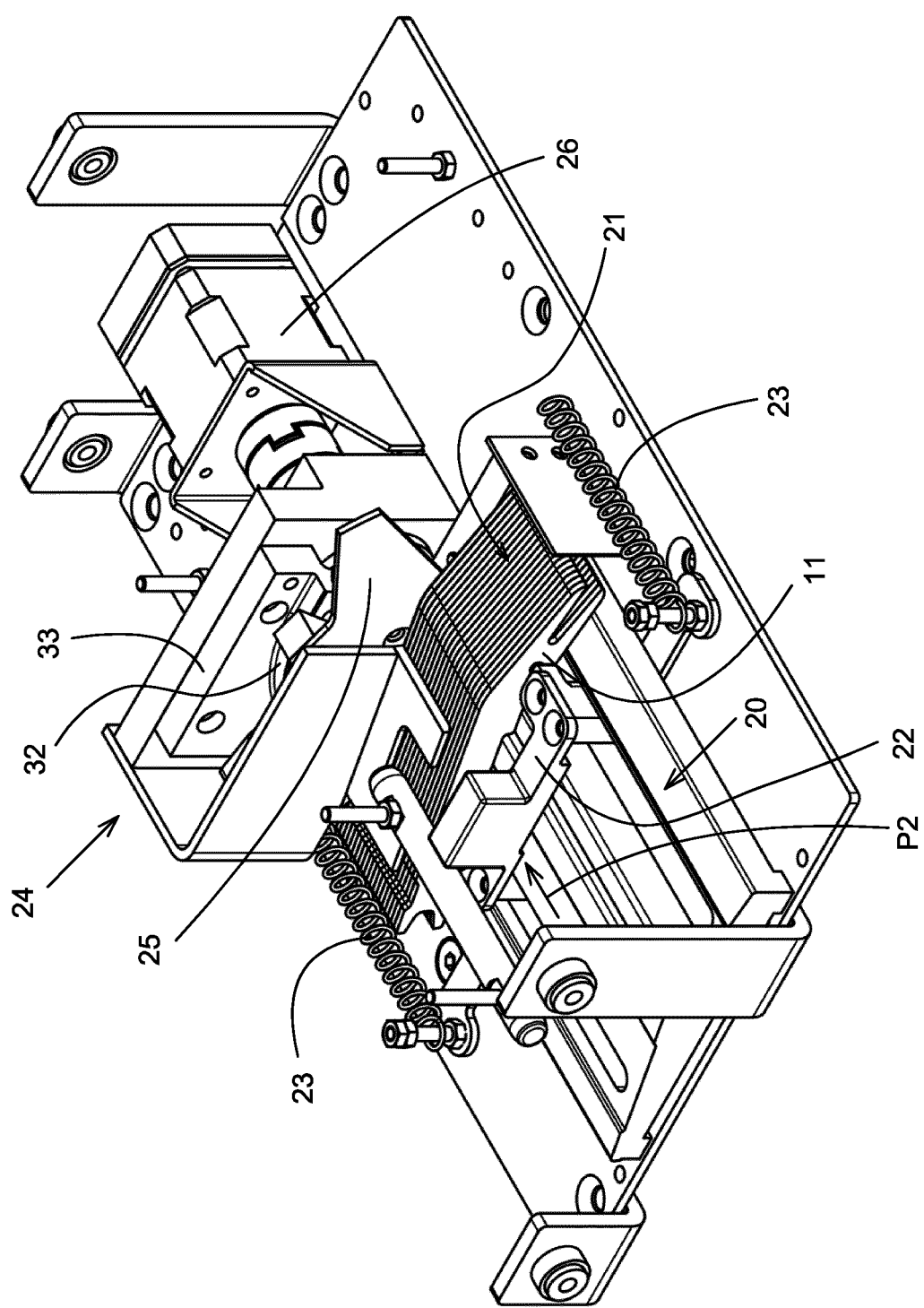
FIG. 3 is a perspective view of a first embodiment of a displacement device of the microwave oven as shown in FIGS. 1A and 1B, FIGS. 4A-4M are detailed side views of the displacement device as shown in FIG. 3 in several different positions during the insertion of the stirring member into the vessel.

FIG. 3 shows a perspective view of a first embodiment of a displacement device 10 of the microwave oven 1.

The displacement device 10 comprises a holder 20 for a number of stirring members 11 being stacked upon each other in a stacking direction indicated by arrow P2 whereby plate-shaped surfaces of adjacent stirring members 11 being in abutment with each other. The stack 21 of stirring members 11 is located on the holder 20 and is movable by means of a slidable pushing member 22 under spring force of springs 23 in the stacking direction indicated by arrow P2. The slidable pushing member 22 forms a transport mechanism. On a side remote of the pushing member 22 a separating device 24 is located. The separating device 24 comprises a pivoting mechanism 25 being actuated by a stepping motor 26.

FIGS. 4A-4M show detailed side views of the displacement device 10 in several different positions during the insertion of the stirring member 11 into the vessel 5.

Figure 4A:
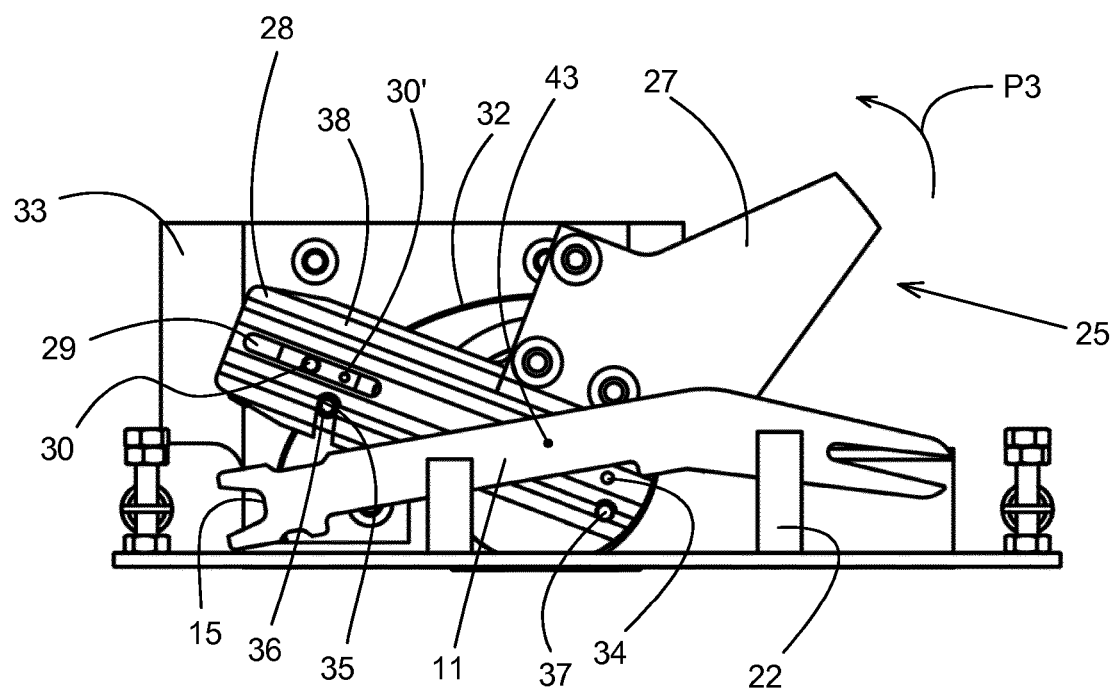
Figure 4C:
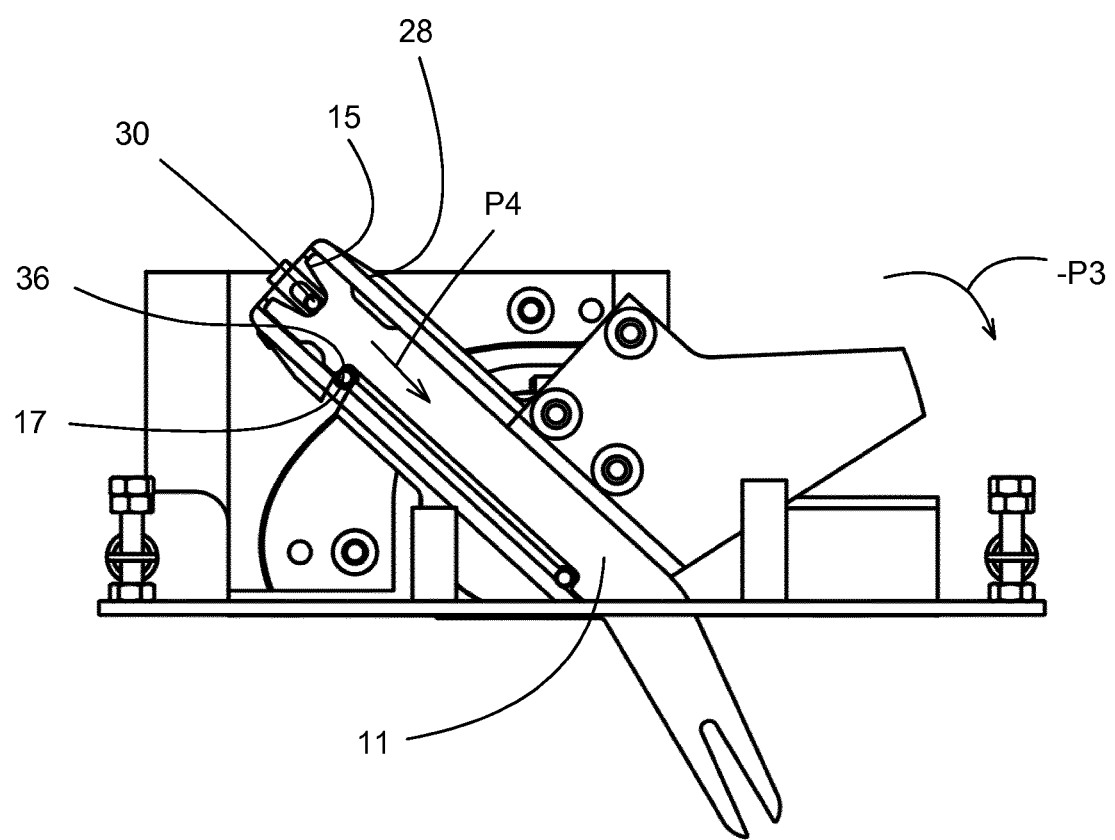

In FIG. 4A the pivoting mechanism 25 is in its initial position. The pivoting mechanism 25 comprises a metal plate 27 being pivotable about a pivot axis 43 in and opposite to a pivot direction indicated by arrow P3. The metal plate 27 is connected to a receiving member 28 for receiving a stirrer member 11. The receiving member 28 comprises a longitudinal slot 29 wherein a pen 30 is slidable movable. The pen 3o is connected to a bearing 31 (see FIG. 4B2) which can roll over a curved path 32 of a frame part 33. Connected to the pen 30' is a spring (not visible) which is connected with an end remote of the pen 30' to pen 34.

The receiving member 28 also comprises a slot 35 in which a pen 36 can insert and slide.

At a distance from the pen 36 a pen 37 is located being movable in a direction parallel to the stacking direction indicated by arrow P2.

To insert a stirring member 11 into the receiving member 28 the pivoting mechanism 25 is being pivoted in the direction as indicated by arrow P3 to the position as shown in FIG. 4B1.

In said position, the first stirring member 11 of the stack 21 is being moved under spring force of springs 23 into a stirring member receiving slot 38 of the receiving member 28. In this position the pen 3o is located in the U-shaped opening 15, the pen 36 is located opposite the abutment portion 17 and the pen 37 is located opposite the abutment portion 18 of the stirrer member 11.

Figure 2B:
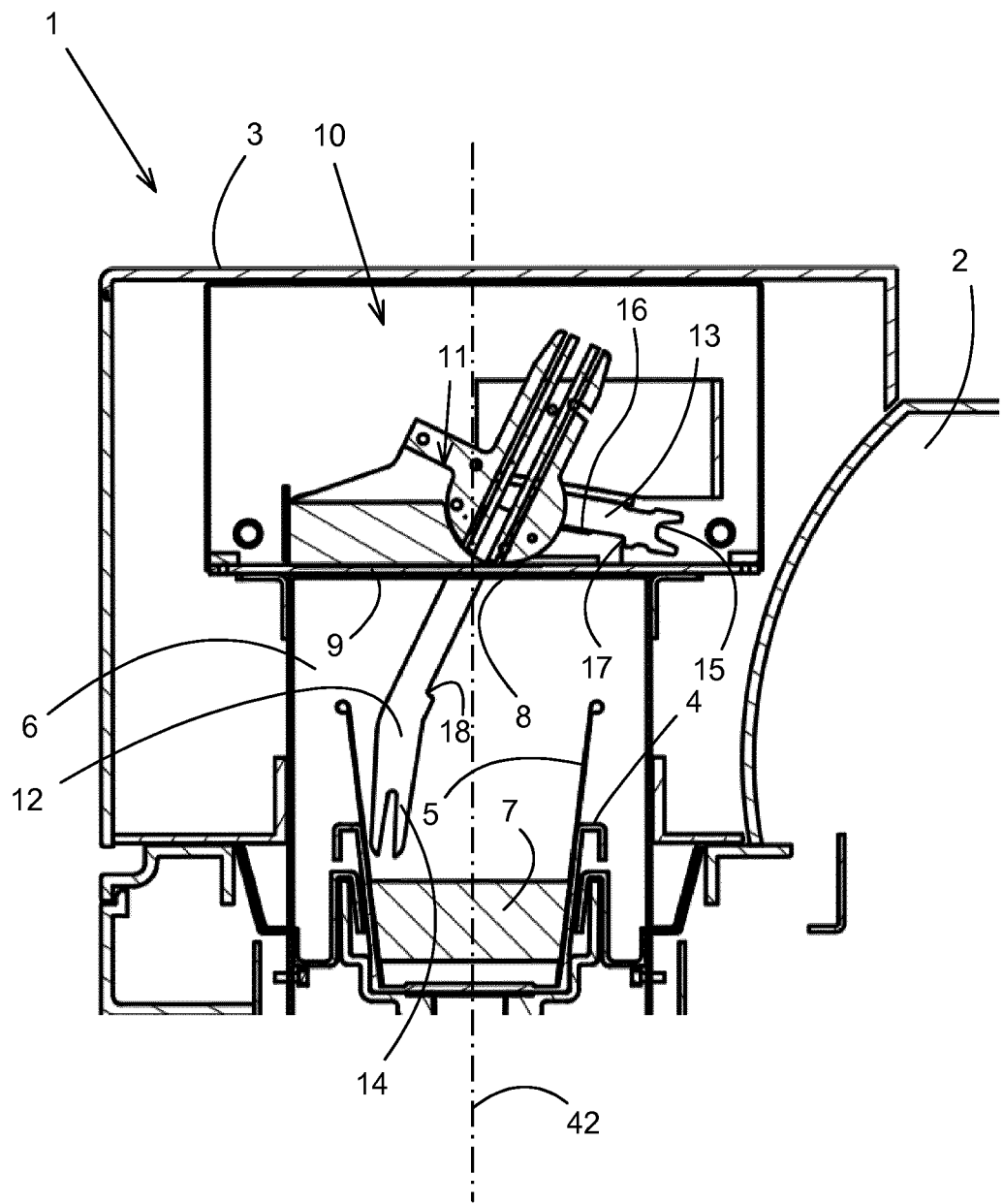
Figure 2C:
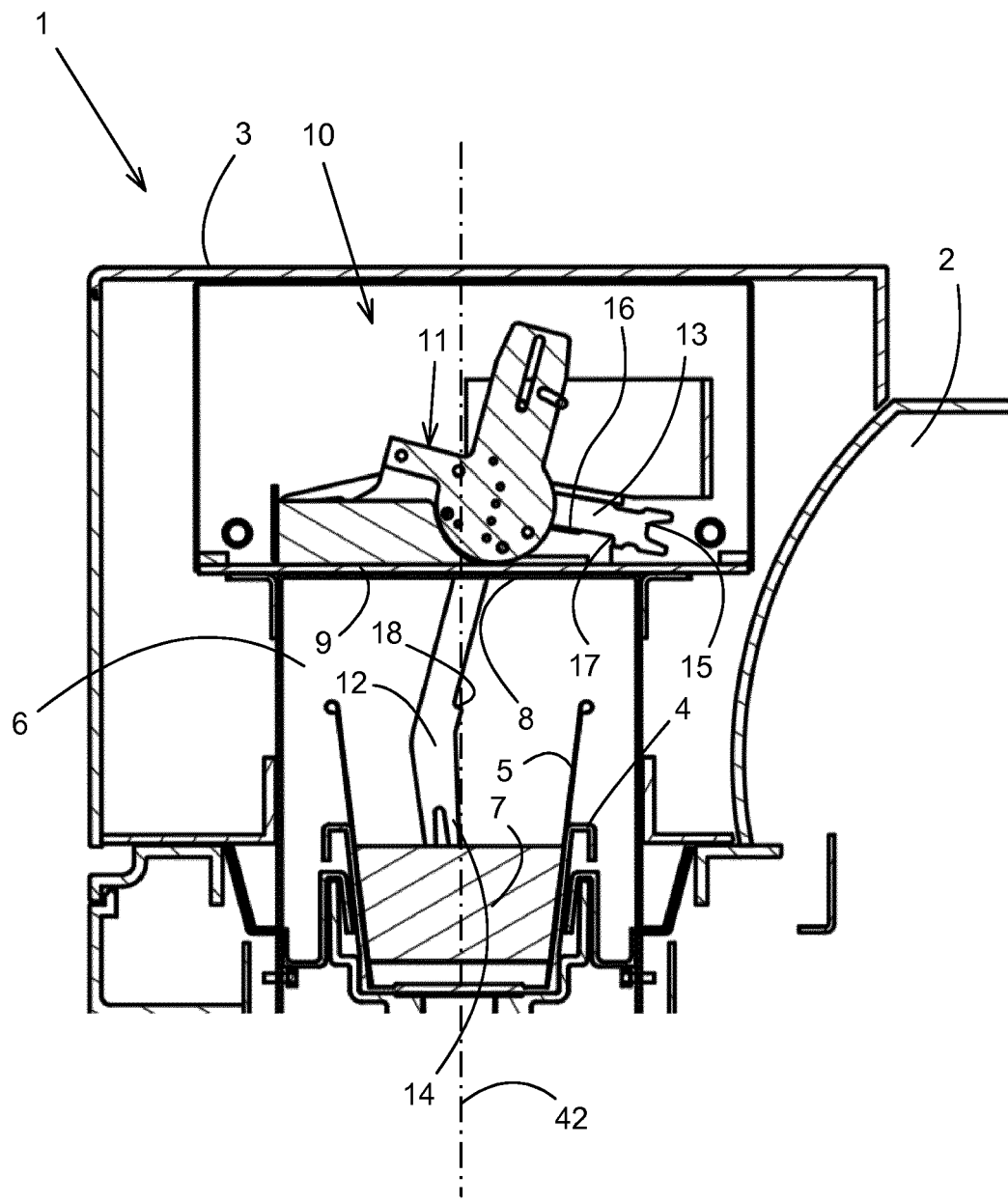

When moving the receiving member 28 to the position as shown in FIG. 4B1 and an enlarged part thereof as shown in FIG. 4B2, the bearing 31 rolls over the curved path 32 of the frame part 33, thereby tensioning the spring connected to the pen 3o'. In this position the bearing 31 and the pen 30 are located the furthest away from the pen 34.

After the stirring member 11 is being inserted into the receiving member 28, the receiving member 28 together with the stirring member 11 are being pivoted in a direction opposite to arrow P3 (see FIG. 4C), thereby moving the stirring member 11 through the opening 9 in the upper wall 8 into the cooking cavity 6. The bearing 31 with pen 30 rolls over the curved path 32 of the frame part 33 whereby the distance between the bearing 31 and the pen 37 gets smaller. The pen 30 will be moved under spring force slightly in the direction indicated by arrow P4 against a wall of the U-shaped opening 15. Due to this movement the abutment portion 17 will become in abutment with pen 36 preventing further movement of the stirrer member 11 in the direction indicated by arrow P4.

Figure 4D:
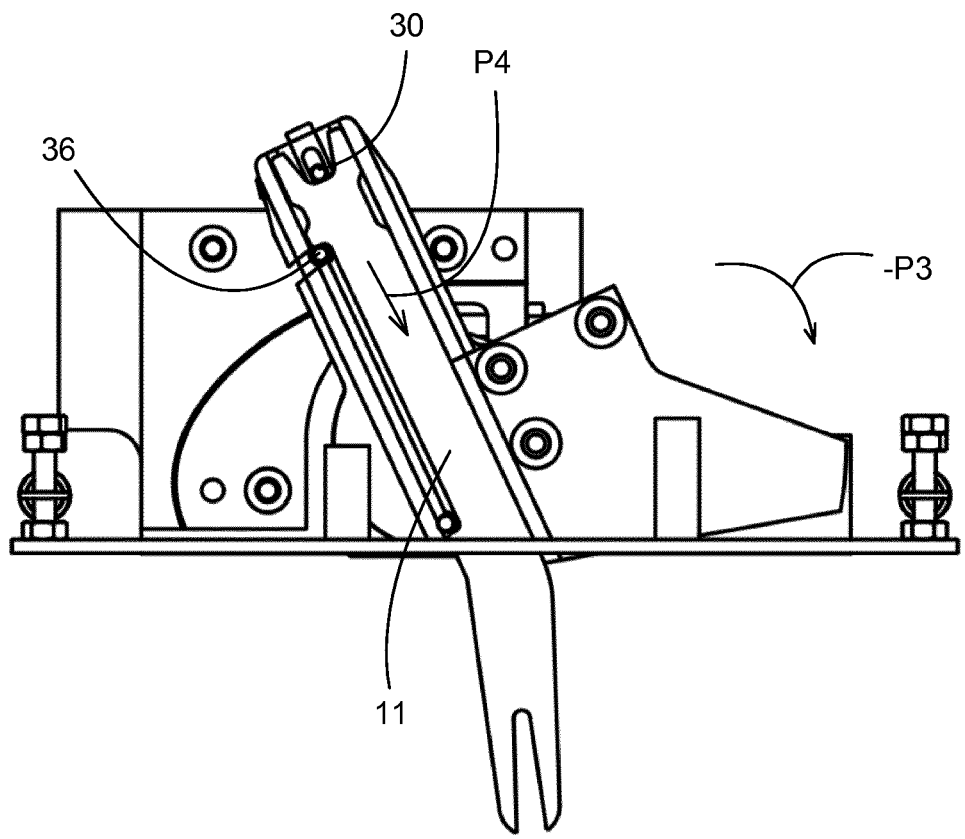
Figure 4E:
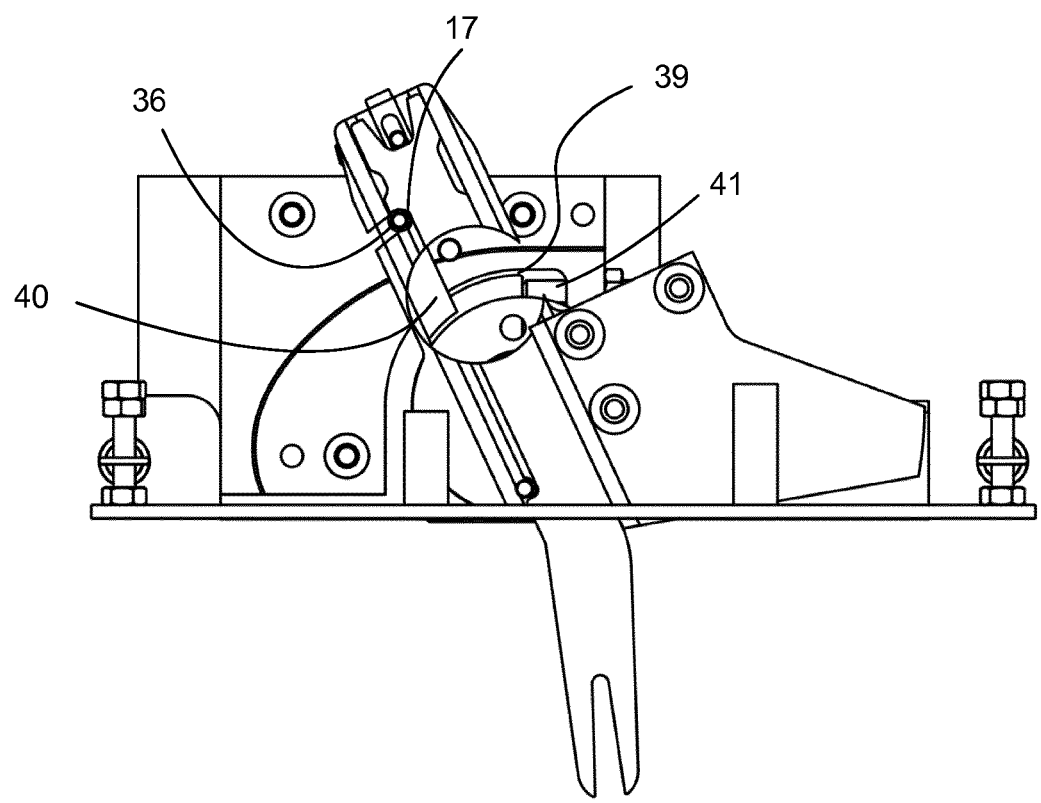
Figure 4F:
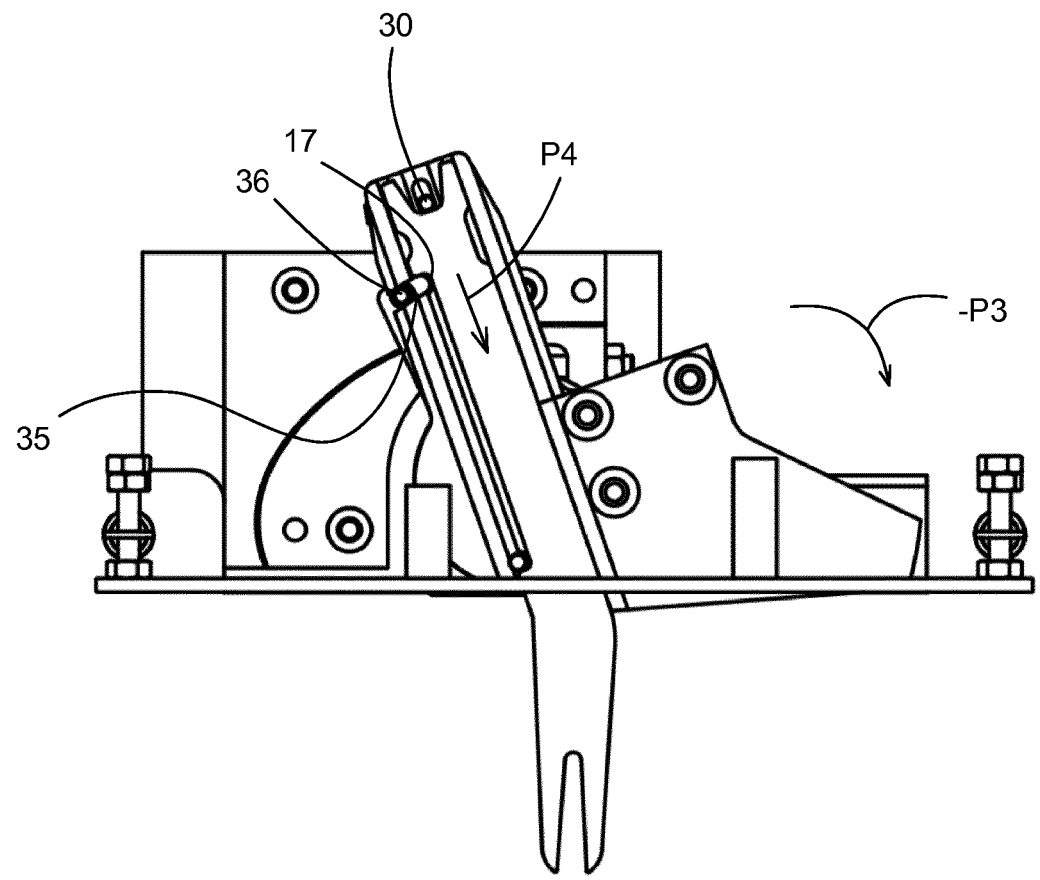
Figure 4G:
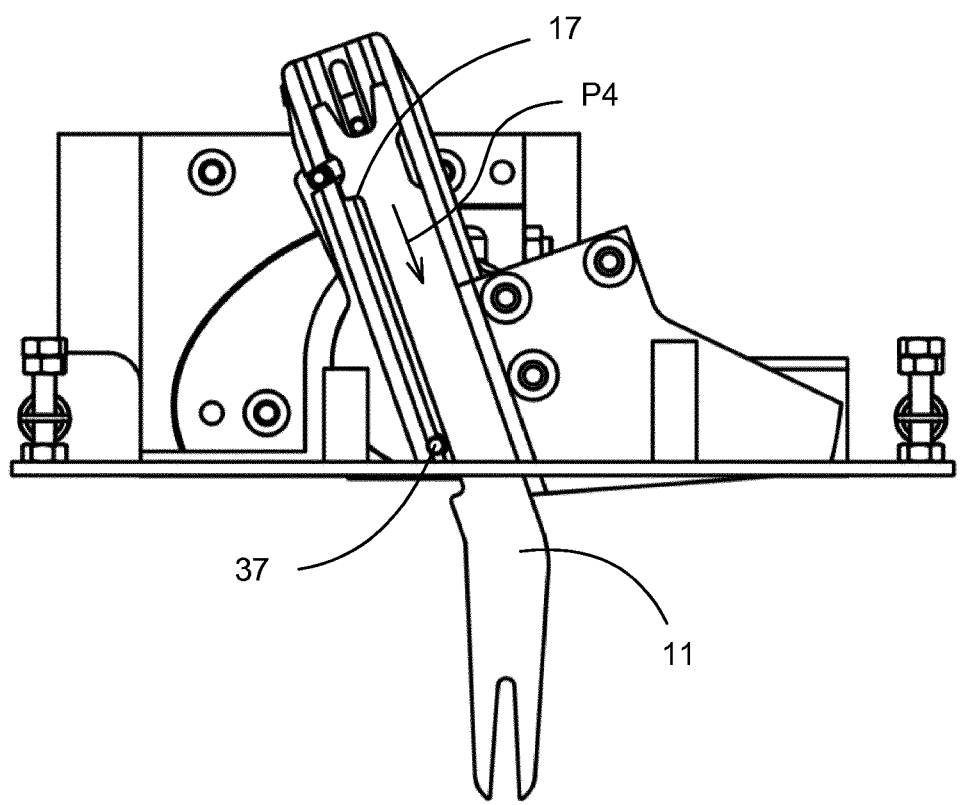

In the steps as shown in FIGS. 4D and 4E the receiving member 28 together with the stirring member 11 are being pivoted further in the direction opposite to arrow P3 until a stopping member 39 connected to pen 36 via element 40 abuts against a stop 41 of frame part 33.

Figure 4H:
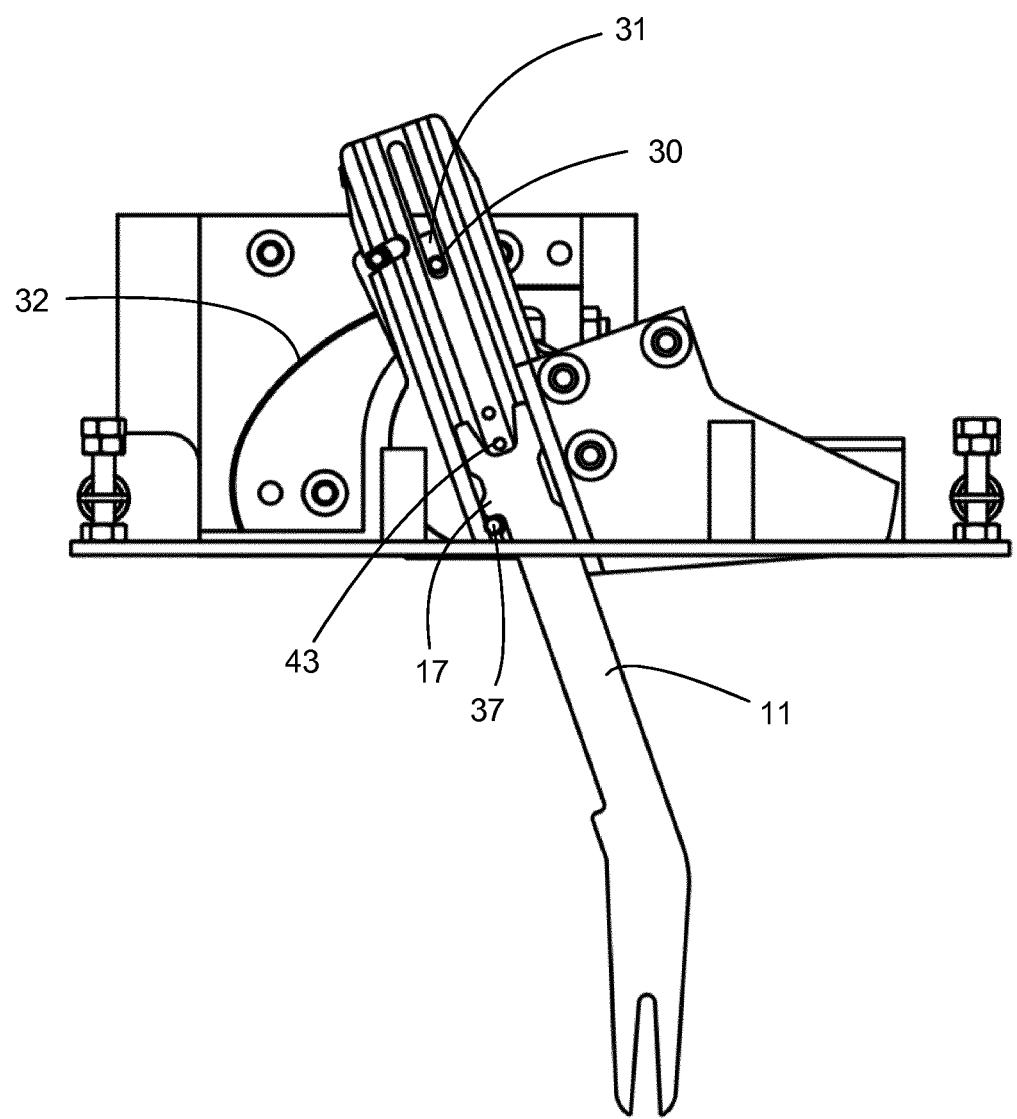
Figure 4J:
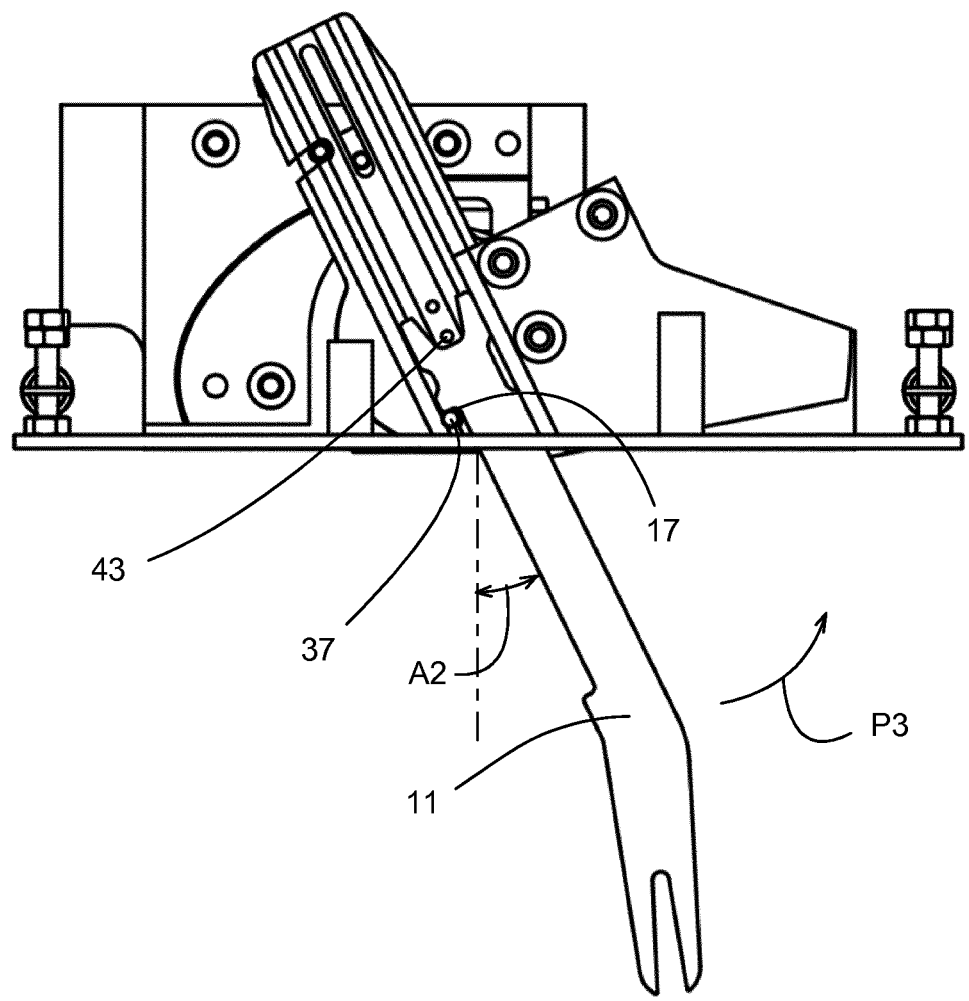
Figure 4K:
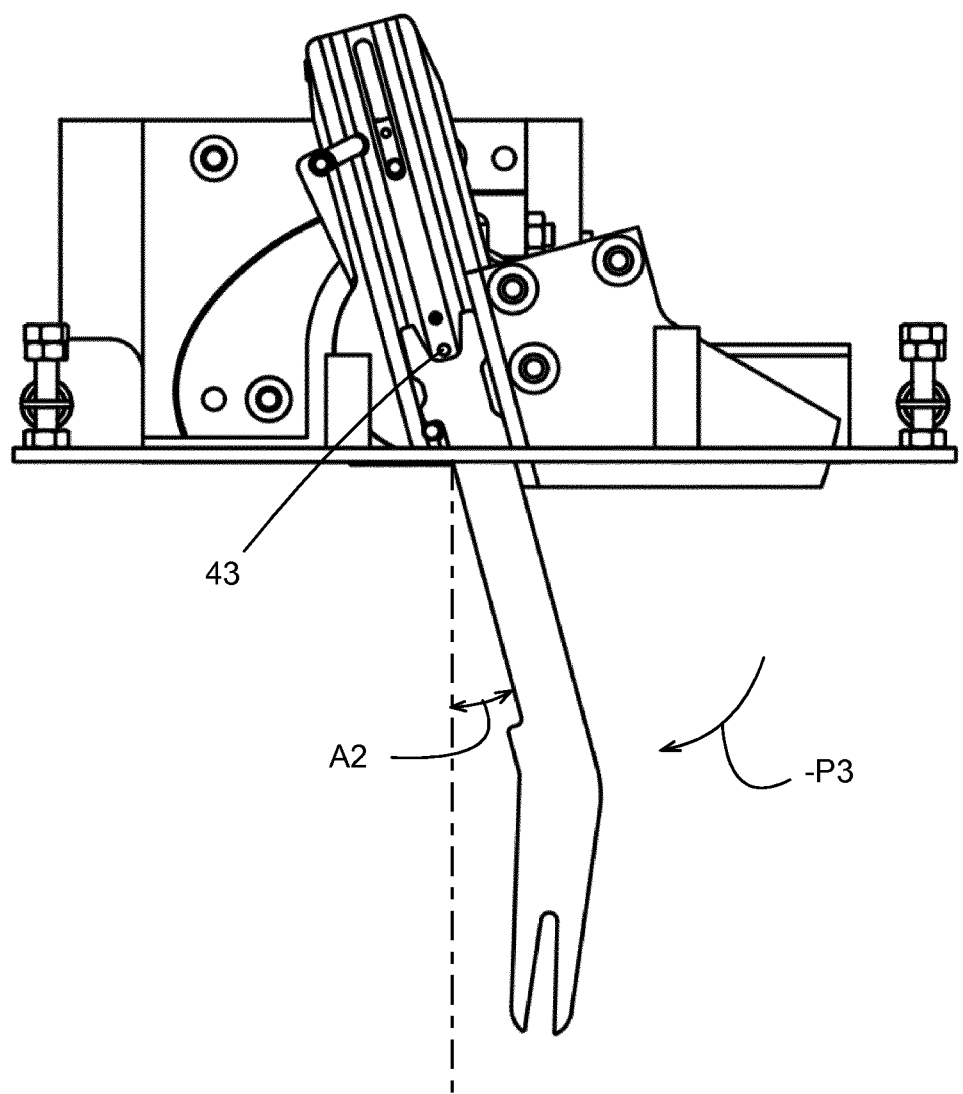
Figure 4L:
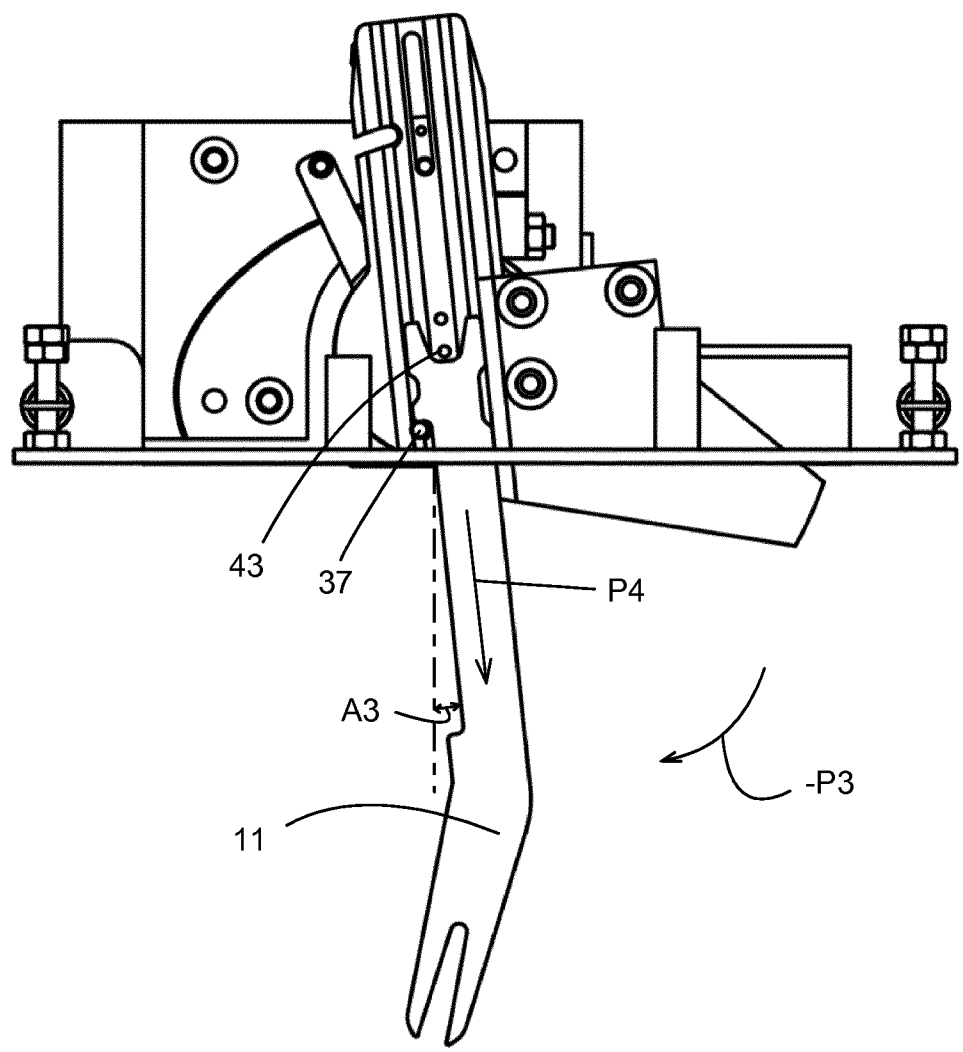

By further pivoting the receiving member 28 together with the stirring member 11 in the direction opposite to arrow P3, the slot 35 and the abutment portion 17 moves away from the pen 36, so that the movement of the stirring member 11 in the direction as indicated by arrow P4 is no longer prevented (see FIG. 4F) due to which the stirring member 11 will be moved under spring force on pen 3o' in the direction as indicated by arrow P4 (see FIGS. 4F, 4G) until the abutment portion 17 rests against the pen 37 (see FIG. 4H). In FIG. 4H it can be seen that the bearing 31 with pen 3o now rests again on the curved path 32.

The stirring member 11 is now located in the vessel 5 and if the level of the foodstuff 7 in the vessel 5 is high enough, the stirring member 11 will also be located in the foodstuff 7.

The microwave oven 1 can be switched on or already be switched on, whereby the foodstuff is exposed to microwave radiation. During this process, the vessel 5 will be rotated in a manner well known in the art by means of the drive means about a rotating axis 42. The receiving member 28 together with the stirring member 11 will be swivelled by swivelling it about pivot axis 43 between an angle A1 (FIG. 4J) of for example 20-30, like 26 degrees and an angle A2 (FIG. 4K) of for example 10-20, like 15 degrees. The angle A1, A2 can be amended depending on the desired displacement during swivelling, the size of the vessel 5, the size and shape of the stirring member 11. The total length of the stirring member 11 can be between several centimetres up to 20 or 30 centimetres, depending a.o. on the size of the vessel 5. Preferably the stirring member 11 is being swivelled from at or about a wall of the vessel till near or beyond the centre line of the vessel 5.

By the combined motion of rotating the vessel 5 about rotating axis 42 and swivelling the stirrer member 11 about pivot axis 43 extending perpendicular to the rotating axis 42 a good stirring of the foodstuff occurs, thereby preventing hotspots, as well as mixing and cutting the foodstuff. The rotation speed can be in the range of 0.5-100 rpm, preferably 1-60 rpm. The swivel speed can be in the range of 2-100, preferably 3-60 swivels per minute.

As soon as the foodstuff is ready, the receiving member 28 together with the stirring member 11 are being pivoted further in the direction opposite to arrow P3 to an angle A3 (FIG. 4L) of for example 6 degrees. When moving to this angle A3, the pen 37 is being moved in the stacking direction P2, so that the abutment portion 17 is no longer in abutment with the pen 37. This forms a releasing device.

Figure 4M:
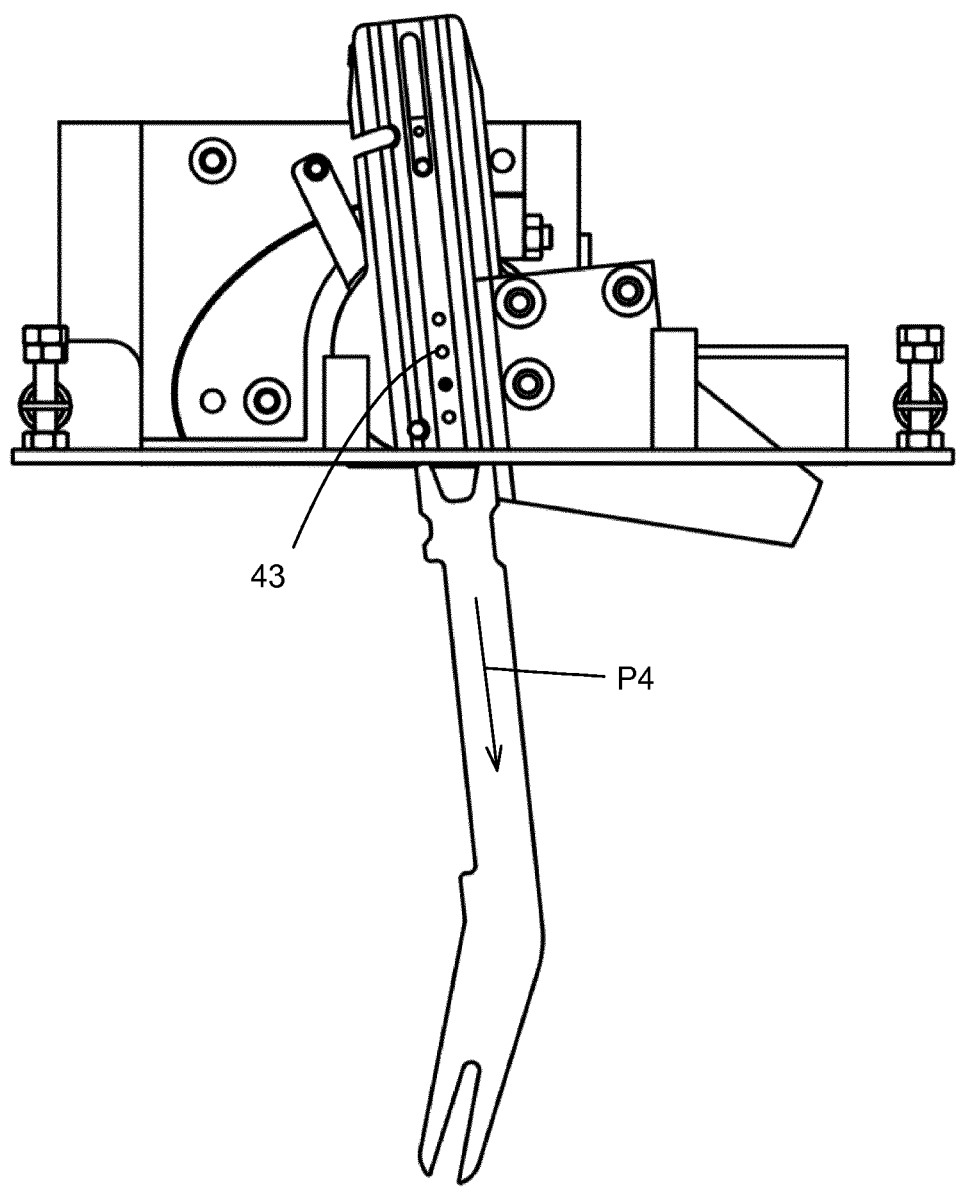

By opening the microwave oven 1 to the position as shown in FIG. 1B, the stirrer member 11 will fall out of the receiving member 28 under gravity and/or will stick to the foodstuff 7 and be pulled out of the receiving member 28 by the foodstuff. If not, the user can pull the stirrer member 11 out the receiving member 28 by himself (FIG. 4M).

Figure 5:
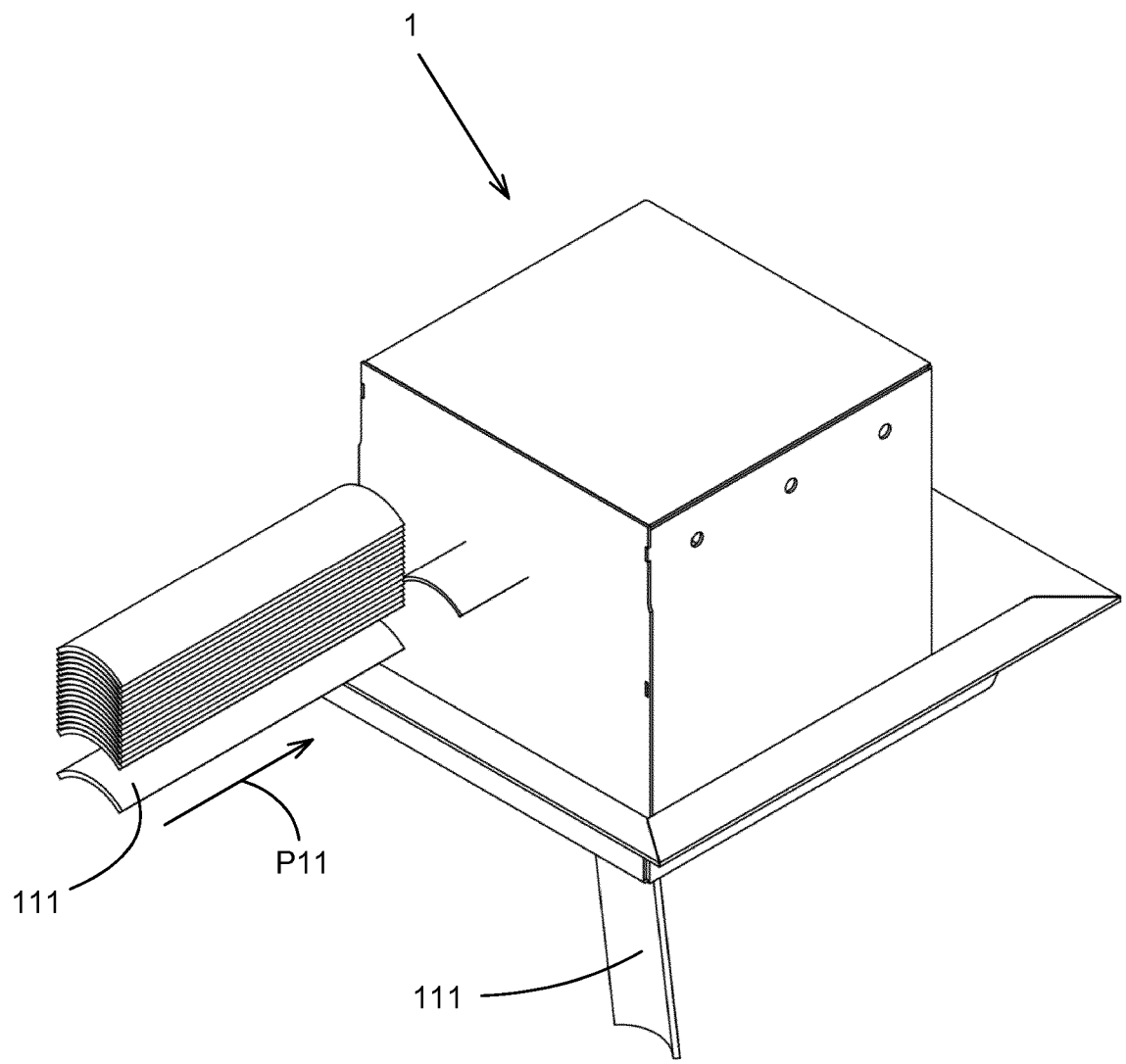
FIGS. 5 and 6 are perspective views of a second embodiment of a displacement device of the microwave oven as shown in FIGS. 1A and 1B, FIGS. 7 and 8 are perspective views of a third embodiment of a displacement device of the microwave oven as shown in FIGS. 1A and 1B, FIGS. 9-12 10 are perspective views of a fourth embodiment of a displacement device of the microwave oven as shown in FIGS. 1A and 1B.
Figure 6:
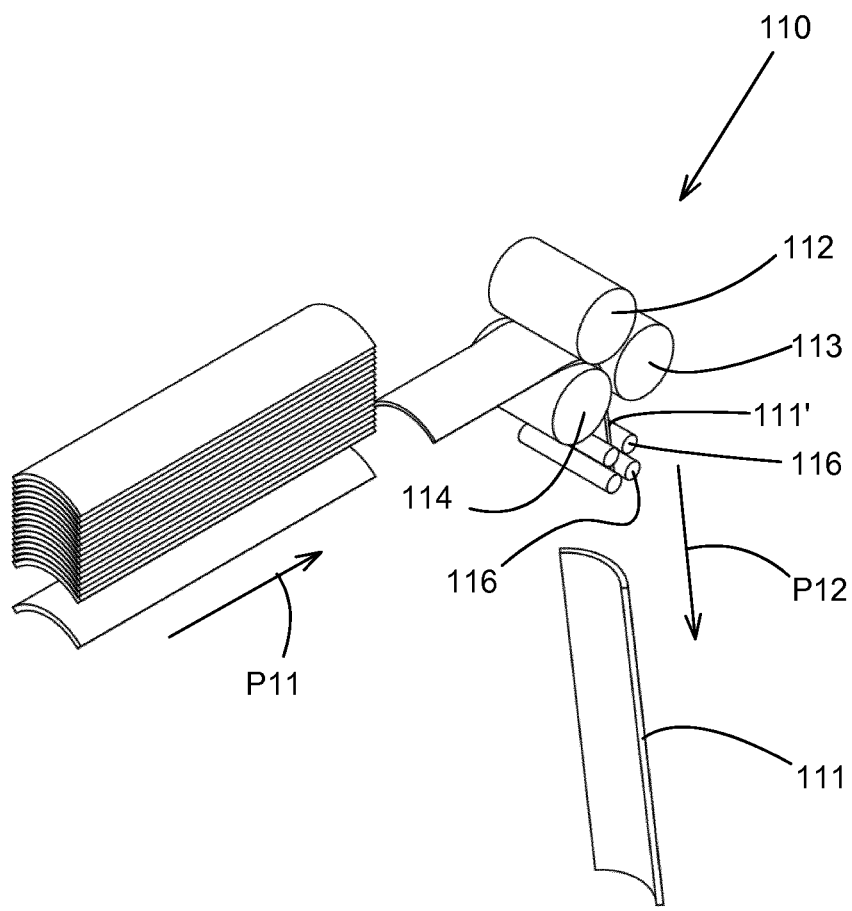

FIGS. 5 and 6 show perspective views of a second embodiment of a displacement device 110 of the microwave oven 1 as shown in FIGS. 1A and 1B for moving a stirrer member 111 into the cooking cavity. The stirrer member 111 comprises a longitudinal strip being curved about an axis extending in the longitudinal direction of the stirrer member 111. Such stirrer members 111 can easily be stacked and separated by moving for example the lowest stirrer member 111 in a direction indicated by arrow P11. The displacement device 110 comprises a number of rotating rollers 112, 113, 114 through which a separated single stirrer member 111 can be guided in a direction indicated by arrow P12 whereby the curved stirrer member 111 is forced against spring force of the stirrer member 111 to a flat stirrer member 111' in which it is inserted by means of rollers 116 through the opening 9 in the upper wall 8 of the cooking cavity 6. As soon as the flat stirrer member 111' is no longer located between the rollers 112, 113, 114, it will return under spring force into its curved position. During operating the microwave oven 1 the stirrer member 111 will be held at one end near the upper wall 8 and be prevented from moving downwardly. It can be kept still during rotation of the vessel 5, it can be swivelled or it can be rotated as well as being swivelled.

Figure 7:
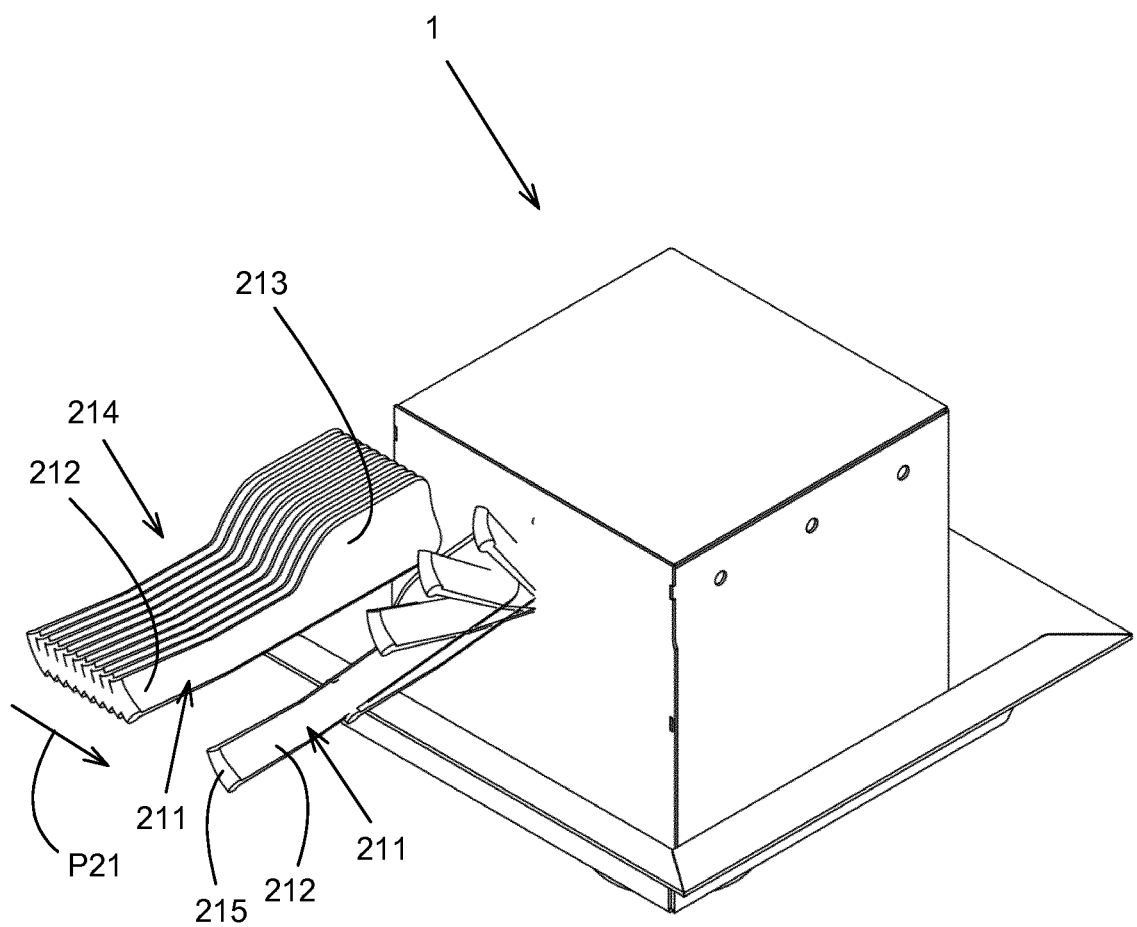
Figure 8:
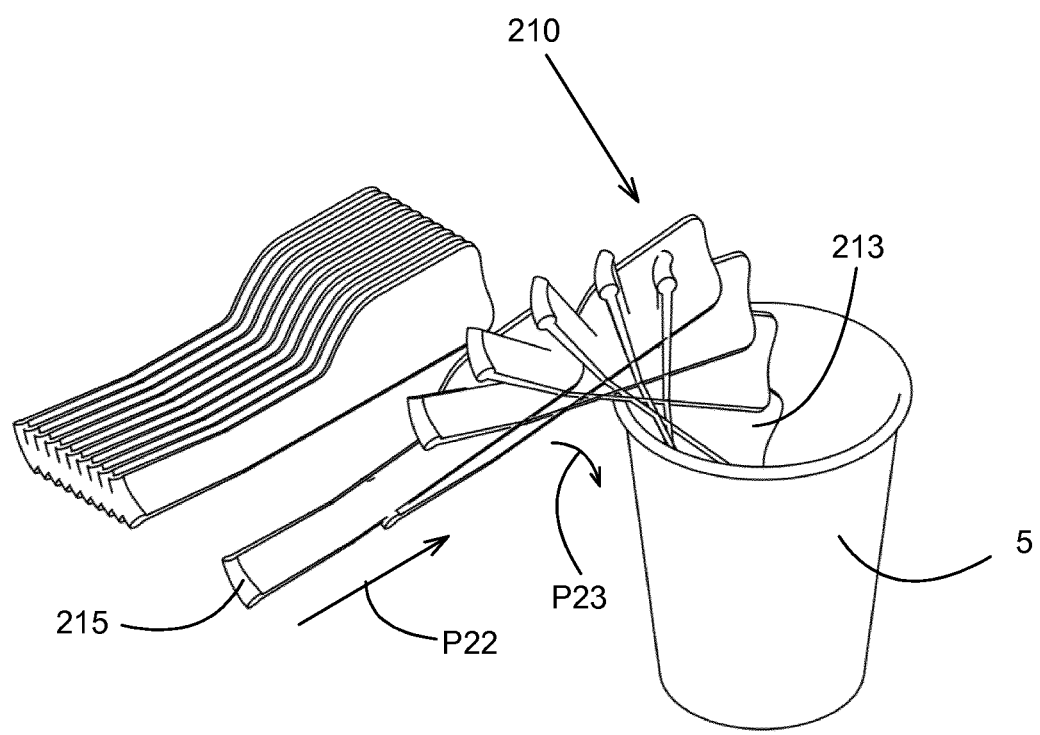
Figure 10:
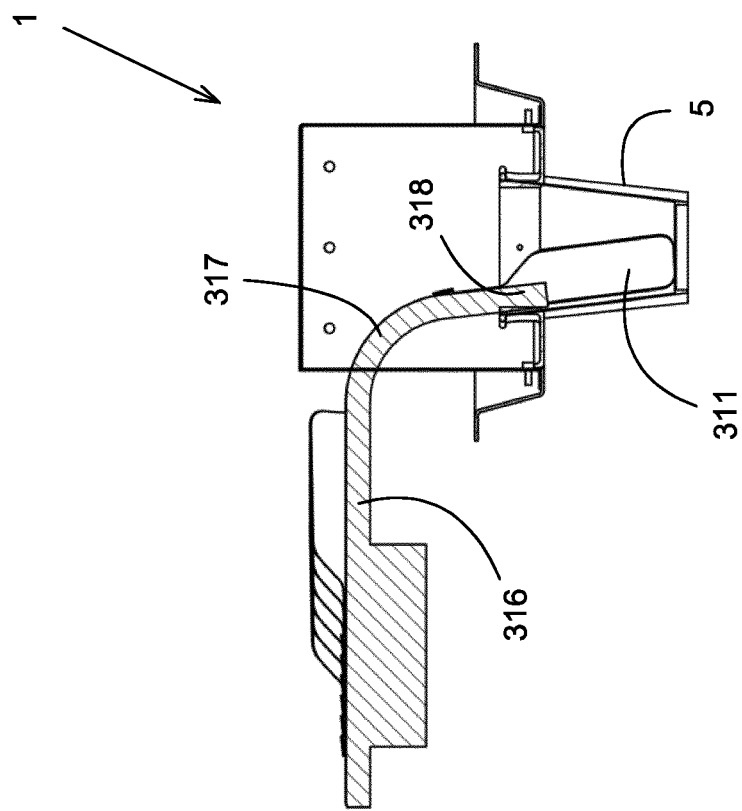
Figure 9:
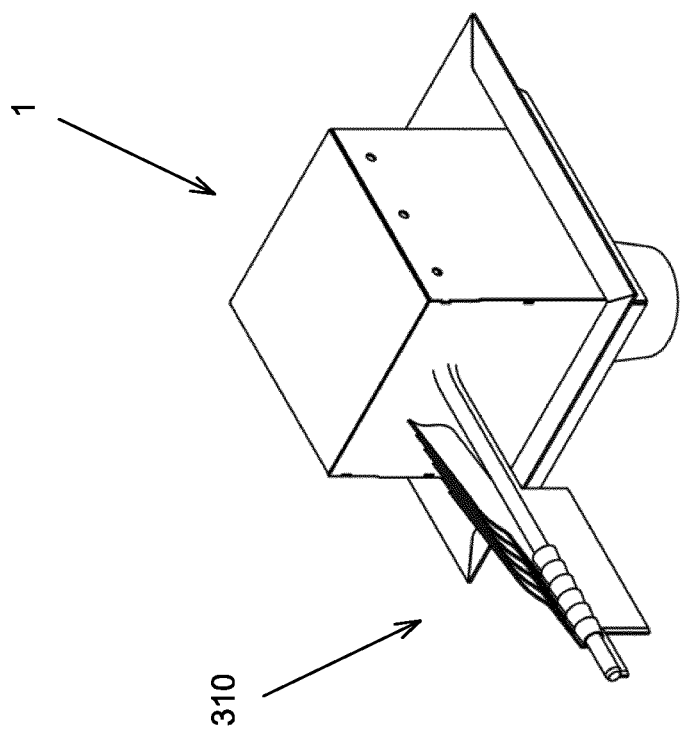
Figure 12:
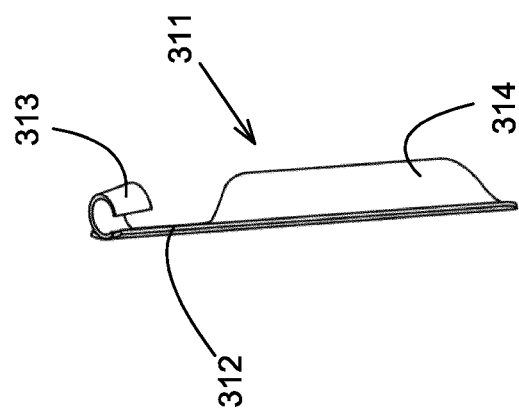
Figure 11:
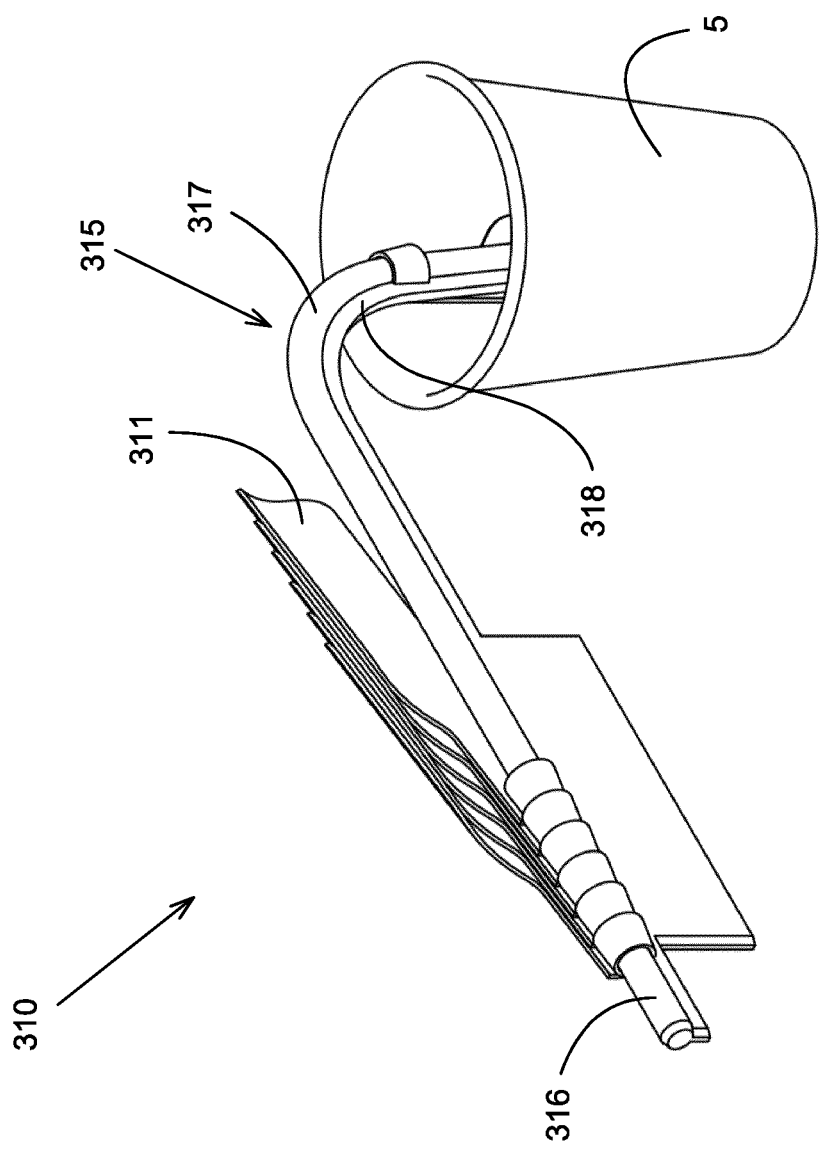

FIGS. 7 and 8 show perspective views of a third embodiment of a displacement device 210 of the microwave oven 1 as shown in FIGS. 1A and 1B for moving stirrer members 211 to the cooking cavity. The stirrer member 211 comprises a handle 212 as well as a spoon shaped part 213. The stirrer members 211 are stackable whereby main surfaces of the stirrer members 211 are in abutment with each other. After moving one stirrer member 211 away from the stack 214 in a direction P21, the stirrer member 211 is moved by the displacement device 210 in the directions as indicated by arrows P22 and P23 through the opening 9 in the upper wall 8 of the cooking cavity 6 and into the vessel 5. The thickened end 215 of the stirrer member 211 can be held in the displacement device 210 during operating the microwave oven 1 and be released after completing the cooking process.

FIGS. 9-12 10 are perspective views of a fourth embodiment of a displacement device 310 of the microwave oven as shown in FIGS. 1A and 1B for moving stirrer members 311 to the cooking cavity. The stirrer member 311 comprises a shaft 312 provided at one end with a ring shaped part 313 and at the other end with a knife shaped part 314. The stirrer members 311 can be stacked by mounting the ring shaped parts 313 on a rod 315 of the displacement device 310. The rod 315 extends horizontally over a first part 316, whereby the stirrer members 311 are stacked on this horizontally first part 316, comprises a curved part 317 and a second part 318 extending downwardly towards the vessel 5. A separated stirrer member 311 is being moved along the first part 316, the curved part 317 and the second part 318, until the ring shaped part 313 of the stirrer member 311 abuts against a thickened end (not visible) of the second part 318. It may also simply rest on a bottom of the vessel 5. Preferably the ring shaped part 313 comprises a small slot 319, so that the ring shaped part 313 can be opened against spring force to remove the ring shaped part 313 from the second part 318.

The movement of the stirrer member 11, 111, 211, 311 can also be done when the microwave oven 1 is open, so that by closing the microwave oven 1 the stirrer member 11, 111, 211, 311 is directly inserted into the vessel 5.

It also possible to only rotate the vessel 5 with respect to the stirrer member 11, 111, 211, 311 without any swivelling motion, whereby either the vessel 5 or the stirrer member 11, 111, 211, 311 or both the vessel 5 and the stirrer member 11, 111, 211, 311 are being rotated. It is also possible to rotate as well as to swivel the stirrer member 11, 111, 211, 311.

The rotating axis 42 extends preferably vertically but, if desired it can extend under an angle with the vertical.

It is also possible to swivel the stirring member 11 between opposite walls of the vessel 5.

The microwave oven can have any suitable shape.

For different foodstuffs the time, temperatures, swivel speeds and rotational speeds etc. can easily experimentally be determined.

It is possible let the stirrer member drop into the foodstuff during or just after cooking or just before bringing the microwave oven 1 to the open position as shown in FIG. 1B.

Each stirrer member 11, 111, 211, 311 preferably has the following features.

It is flat so that it can be stacked onto each other. This reduces storage space that could make the corresponding displacement device 10, 110, 210, 310 relatively small.

Each stirrer member 11, 111, 211, 311 contains a sliding edge for insertion/guidance by the to corresponding displacement device 10, 110, 210, 310.

The stirrer member 11, 111, 211, 311 comprises a stopper part limiting the length over which it is inserted in the vessel during cooking.

The stirrer member 11, 111, 211, 311 may comprise a cutting part to cut for example the scrambled egg. Preferably it is not so sharp that a user can accidentally cut himself.

The embodiments as shown above have been described regarding a microwave oven. The same results can be obtained by using a steam oven instead of a microwave oven or by using another kind of oven suitable for heating the foodstuff.

Microwave has the advantage that it does not require any heat up cycle, which is efficient. Steam can be beneficial when higher cooking temperatures are required. Since steam will add moisture to the foodstuff, using steam is advantageous when drying out of food, during heating, becomes critical.

LIST OF REFERENCE SIGNS 1 microwave oven
2 lower part 3 upper part
4 holder
5 vessel
6 cooking cavity
7 foodstuff
8 upper wall
9 opening
10 displacement device
11 stirrer member
12 first part
13 second part
14 teeth
15 U shaped opening
16 wall
17 abutment portion
18 abutment portion
20 holder
21 stack
22 pushing member
23 spring
24 separating device
25 pivoting device
26 stepping motor
27 metal plate
28 receiving member
29 longitudinal slot
30 pen
30' pen
31 bearing
32 curved path
33 frame part
34 pen
35 slot
36 pen
37 pen
38 receiving slot
39 stopping member
40 element
41 stop
42 rotating axis
43 pivot axis
110 displacement device
111 curved stirrer member
111' flat stirrer member
112 roller
113 roller
114 roller
116 roller
210 displacement device
211 stirrer member
212 handle
213 spoon shaped part
214 stack
215 thickened end
310 displacement device
311 stirrer member
312 shaft
313 ring shaped part
314 knife shaped part
315 rod
316 first part
317 curved part
318 second part
319 slot
A1 angle
A2 angle
A3 angle
P1 arrow
P2 arrow
P3 arrow
P4 arrow
P21 arrow
P22 arrow

The invention claimed is:

1. An oven comprising a cooking cavity, a stirring member extending, in use, into foodstuff contained in a vessel disposed in the cooking cavity as well as drive means to provide, in use, relative movement between the stirring member and the vessel, wherein the oven comprises a displacement device to move the stirring member from outside the cooking cavity through an opening in a wall bounding the cooking cavity into the cooking cavity and into the vessel disposed in the cooking cavity.

2. The oven according to claim 1, wherein the oven comprises a holder for holding a number of stirring members, wherein the displacement device is provided with a separating device to separate one of the stirring members from the number of stirring members located in said holder and to move said first one of the number of stirring members from outside the cooking cavity through the wall bounding the cooking cavity into the cooking cavity as well as, in use, into the vessel disposed in the cooking cavity.

3. The oven according to claim 2, wherein the number of stirring members are stacked upon each other in the holder in a stacking direction, which displacement device comprises a transport device to transport the stacked number of stirring members in the stacking direction, which separating device comprises a pivoting device to pivot a first one of the stacked number of stirring members about a pivot axis extending parallel to the stacking direction through the opening in the wall.

4. The oven according to claim 3, wherein the displacement comprises a translation device to translate the pivoted stirring member in a translation direction extending perpendicular to the pivot axis towards the vessel.

5. The oven according to claim 3, wherein the stirring member is translated under spring force in the translation direction.

6. The oven according to claim 1, wherein the displacement device comprises a releasing device to release the stirring member from the displacement device.

7. The oven according to claim 1, wherein the drive means comprises means to rotate, in use, the vessel with respect to the stirring member about a rotating axis, whilst the displacement device comprises means to swivel the stirring member about a swivel axis extending at an angle between 60-120 degrees to the rotating axis.

8. The oven according to claim 7, wherein the swivel axis extends perpendicular to the rotating axis.

9. The oven according to claim 1, wherein the oven is a microwave oven, steam oven or another kind of oven.

10. A method for stirring foodstuff contained in a vessel disposed in the cooking cavity of a oven by means of a stirring member, whereby the vessel is being relatively moved with respect to the stirring member, wherein by means of a displacement device the stirring member is being moved from outside the cooking cavity through an opening in a wall bounding the cooking cavity into the cooking cavity and into the vessel disposed in the cooking cavity.

11. The method according to claim 10, wherein the oven comprises a holder for holding a number of stirring members, wherein the displacement device is provided with a separating device, whereby one of the stirring members is being separated from the number of stirring members located in said holder by the separating device and is being moved from outside the cooking cavity through the wall bounding the cooking cavity into the cooking cavity and into the vessel disposed in the cooking cavity.

12. The method according to claim 10, wherein the number of stirring members are stacked upon each other after which a first one of the stacked number of stirring members is being pivoted about a pivot axis extending parallel to the transport direction by through the opening in the wall (8).

13. The method according to claim 12, wherein the pivoted stirring member is being translated in a translation direction extending perpendicular to the pivot axis towards the vessel.

14. The method according to claim 12, wherein the pivoted stirring member is translated under spring force in the translation direction.

15. The method according to claim 10, wherein stirring member is being released from the displacement device by a releasing device.

16. The method according to claim 10, wherein the vessel is being rotated with respect to the stirring member about a rotating axis, whilst the one stirring member is being swivelled about a swivel axis extending at an angle between 60-120 degrees to the rotating axis.

17. The method according to claim 10, wherein the foodstuff is being heated in the oven by means of microwaves, steam or other means.

18. The method according to claim 10, wherein the swivel axis extends perpendicular to the rotating axis.

* * * * *